US011785126B2

(12) United States Patent
Park et al.

(10) Patent No.: US 11,785,126 B2
(45) Date of Patent: Oct. 10, 2023

(54) ELECTRONIC DEVICE INCLUDING ACOUSTIC ASSEMBLY

(71) Applicant: SAMSUNG ELECTRONICS CO., LTD., Suwon-si (KR)

(72) Inventors: Choonghyo Park, Suwon-si (KR); Kiwon Kim, Suwon-si (KR); Myoungsung Sim, Suwon-si (KR); Changshik Yoon, Suwon-si (KR); Woojin Cho, Suwon-si (KR); Joonrae Cho, Suwon-si (KR); Hyunggwang Kang, Suwon-si (KR); Byounghee Lee, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 17/519,760

(22) Filed: Nov. 5, 2021

(65) Prior Publication Data
US 2022/0150340 A1    May 12, 2022

Related U.S. Application Data

(63) Continuation of application No. PCT/KR2021/015805, filed on Nov. 3, 2021.

(30) Foreign Application Priority Data

Nov. 6, 2020 (KR) .................. 10-2020-0147763
Dec. 17, 2020 (KR) .................. 10-2020-0177794

(51) Int. Cl.
*H04M 1/03* (2006.01)
*H04M 1/02* (2006.01)
*H04R 1/34* (2006.01)

(52) U.S. Cl.
CPC ......... *H04M 1/035* (2013.01); *H04M 1/0268* (2013.01); *H04M 1/0277* (2013.01); *H04R 1/345* (2013.01); *H04R 2499/11* (2013.01)

(58) Field of Classification Search
CPC .. H04M 1/035; H04M 1/0268; H04M 1/0277; H04R 1/345; H04R 2499/11
(Continued)

(56) References Cited

U.S. PATENT DOCUMENTS

| 6,243,260 B1 * | 6/2001 | Lundgren ............. G06F 1/1616 |
| | | 381/87 |
| 7,894,850 B2 * | 2/2011 | Chen ....................... H04M 1/03 |
| | | 455/550.1 |

(Continued)

FOREIGN PATENT DOCUMENTS

| JP | 2009-38430 | 2/2009 |
| JP | 2012-034124 | 2/2012 |

(Continued)

OTHER PUBLICATIONS

International Search Report and Written Opinion dated Feb. 7, 2022 in corresponding International Application No. PCT/KR2021/015805.

*Primary Examiner* — Sean H Nguyen
(74) *Attorney, Agent, or Firm* — Nixon & Vanderhye, P.C.

(57) ABSTRACT

An electronic device according to various embodiments of the disclosure may include: a first housing, a second housing accommodating at least a portion of the first housing and configured to guide sliding movement of the first housing, and an acoustic assembly including an acoustic component comprising acoustic circuitry disposed inside the first housing, a first pipe extending from the acoustic component toward a first end of the first housing, and a second pipe extending from an edge portion of the second housing to a second end of the second housing toward the first housing. The first end of the first housing or the second end of the second housing for connecting the first pipe and the second (Continued)

pipe when the first housing is accommodated in the second housing may be provided in a shape having a specified slope with respect to the edge portion of the second housing.

15 Claims, 10 Drawing Sheets

(58) Field of Classification Search
USPC .......................................................... 381/338
See application file for complete search history.

(56) References Cited

U.S. PATENT DOCUMENTS

| | | |
|---|---|---|
| 10,341,751 B2 * | 7/2019 | Kwong ................ H04R 1/2811 |
| 10,887,683 B1 | 1/2021 | Choi et al. |
| 2013/0108082 A1 | 5/2013 | Dave et al. |
| 2017/0280230 A1 | 9/2017 | Kim et al. |
| 2019/0305237 A1 | 10/2019 | Shin et al. |
| 2019/0384438 A1 | 12/2019 | Park et al. |
| 2020/0221585 A1 | 7/2020 | Cho |
| 2020/0329132 A1 | 10/2020 | Jung et al. |

FOREIGN PATENT DOCUMENTS

| | | |
|---|---|---|
| KR | 10-2007-0011810 | 1/2007 |
| KR | 10-2010-0032206 | 3/2010 |
| KR | 10-2013-0076450 | 7/2013 |
| KR | 10-2017-0110884 | 10/2017 |
| KR | 10-2019-0141518 | 12/2019 |
| KR | 10-2020-0084980 | 7/2020 |
| KR | 10-2020-0119003 | 10/2020 |
| KR | 10-2021-0143419 | 11/2021 |

* cited by examiner

ELECTRONIC DEVICE INCLUDING ACOUSTIC ASSEMBLY

CROSS-REFERENCE TO RELATED APPLICATIONS

This application is a continuation of International Application No. PCT/KR2021/015805 designating the United States, filed on Nov. 3, 2021, in the Korean Intellectual Property Receiving Office and claiming priority to Korean Patent Application No. 10-2020-0147763, filed on Nov. 6, 2020, in the Korean Intellectual Property Office and Korean Patent Application No. 10-2020-0177794, filed on Dec. 17, 2020, in the Korean Intellectual Property Office, the disclosures of all of which are incorporated by reference herein in their entireties.

BACKGROUND

Field

The disclosure relates to an electronic device including an acoustic assembly.

Description of Related Art

In line with the development of electronic, information, and communication technologies, various functions are being integrated into one portable communication device or electronic device. For example, a smartphone includes a function of a sound reproducing device, an imaging device, or an electronic notebook, as well as a communication function, and various functions may be implemented in the smartphone through further installation of applications.

As personal or portable communication devices such as smartphones are commonly used, user demands for portability and convenience for use are increasing. For example, a touch screen display, which is, for example, an output device that outputs visual information, may provide a virtual keypad that replaces a mechanical input device (e.g., a button type input device). As a result, the portable communication device or electronic device can provide the same or more improved usability (e.g., a larger screen) while being miniaturized. On the other hand, commercialization of flexible, for example, foldable or rollable displays is expected to further improve the portability and convenience for use of electronic devices.

In a foldable or rollable electronic device, structures of the electronic device may move (e.g., slide, rotate, or pivot) relative to each other. In this case, as some structures (e.g., a first housing and a portion of a flexible display) move into or away from the other structure (e.g., a second housing), it is necessary to maintain a sealing state between the two structures. For example, a pipe of an acoustic assembly formed to penetrate two structures may be connected or spaced apart as the two structures move relative to each other, and if sealing of the pipe is not maintained, degradation of performance or degradation of sound quality in tele-conversation may occur due to reduction of a reproduction band.

SUMMARY

Embodiments of the disclosure provide an electronic device in which, when the structures (e.g., housings) moves relative to each other (e.g., rotating or sliding movement), the sealing condition of the acoustic assembly pipe, which is separated or combined, may be improved.

An electronic device according to various example embodiments of the disclosure may include: a first housing, a second housing accommodating at least a portion of the first housing and configured to guide sliding movement of the first housing, and an acoustic assembly including an acoustic component comprising a acoustic circuitry disposed inside the first housing, a first pipe extending from the acoustic component toward a first end of the first housing, and a second pipe extending from an edge portion of the second housing to a second end of the second housing toward the first housing. The first end of the first housing or the second end of the second housing for connecting the first pipe and the second pipe based on the first housing being accommodated in the second housing may be provided in a shape having a specified slope with respect to the edge portion of the second housing.

An electronic device according to various example embodiments of the disclosure may include: a first housing, a second housing accommodating at least a portion of the first housing and configured to guide sliding movement of the first housing, a flexible display including a first display area disposed on the first housing and a second display area extending from the first display area to be movable to the inside or outside of the second housing, based on the sliding movement of the first housing, an acoustic component including acoustic circuitry disposed inside the first housing, an acoustic assembly including an acoustic component disposed inside the first housing, a first pipe extending from the acoustic component toward a first end of the first housing, and a second pipe extending from an edge portion of the second housing to a second end of the second housing toward the first housing, and a sealing member disposed between the first end of the first housing or the second end of the second housing. Based on the first housing being accommodated in the second housing, the ends of the first pipe and the second pipe facing each other may be formed in a diagonal shape, and may be connected by an accommodation space formed by the sealing member.

An electronic device according to various example embodiments enables stable movement of housings relative to each other, and can maintain the sealing condition when the pipes of the acoustic assembly, which are respectively disposed in the housings, are separated or combined.

An electronic device according to various example embodiments can provide a structure capable of applying a power signal of an acoustic assembly according to relative movement (e.g., rotating or sliding movement) of housings.

The effects obtainable from the disclosure are not limited to the effects mentioned above, and other effects not mentioned above will be clearly understood by those of ordinary skill in the art to which the disclosure pertains from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
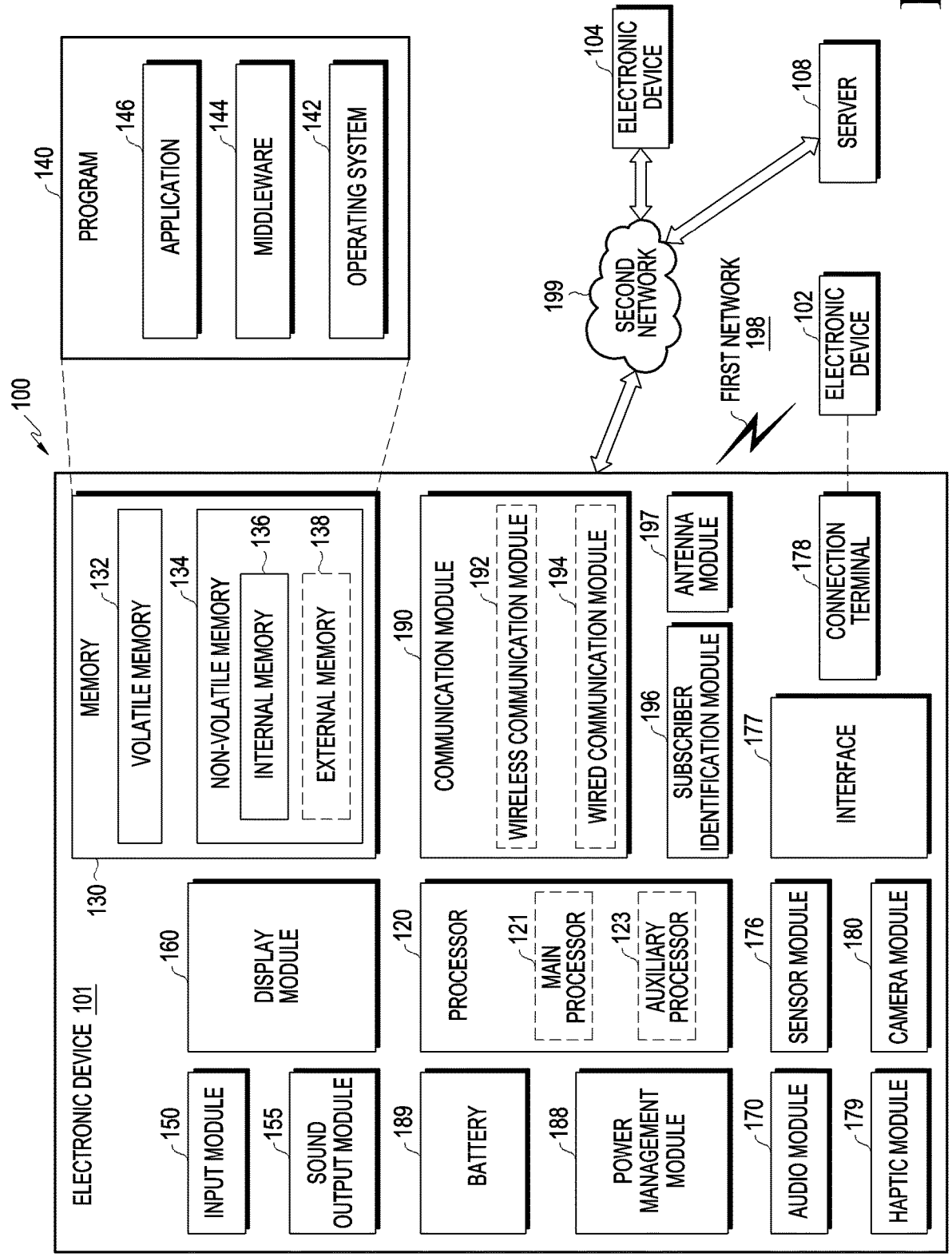
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
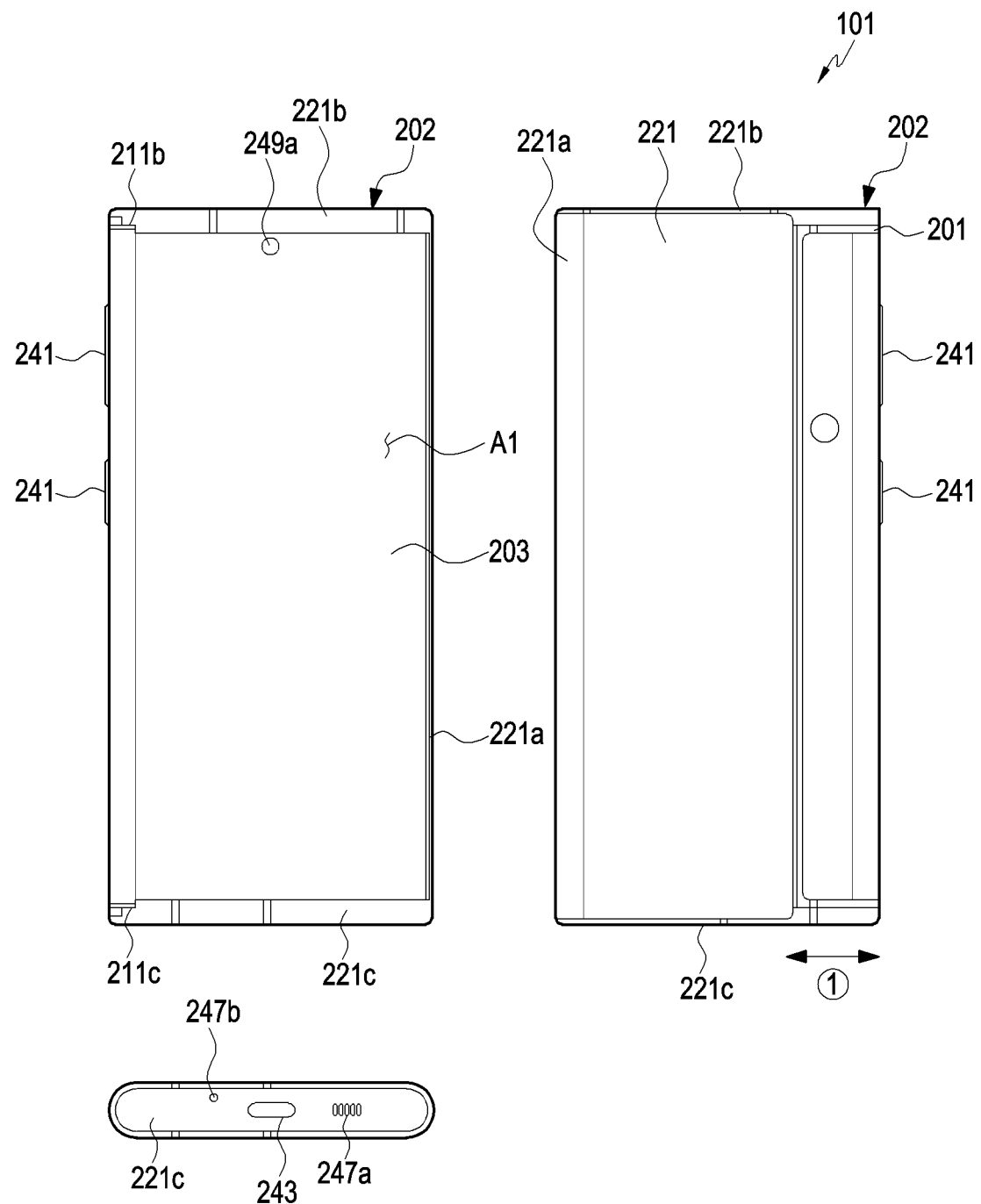
FIG. 2 is a diagram illustrating the state in which a second display area of a flexible display is received inside a second housing according to various embodiments.
Figure 3:
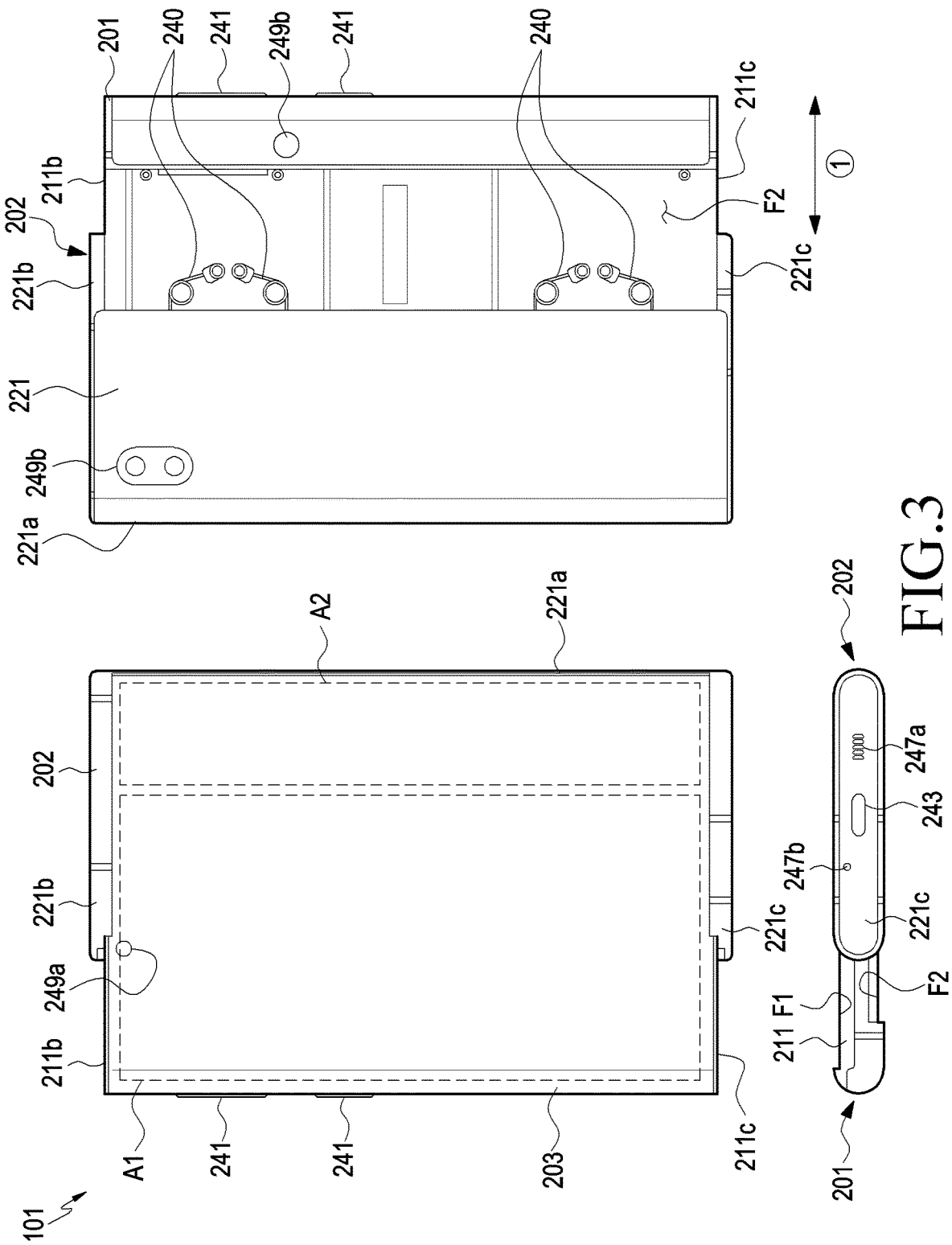
FIG. 3 is a diagram illustrating the state in which a second display area of a flexible display is exposed to the outside of a second housing according to various embodiments.

FIG. 2 is a diagram illustrating the state in which a second display area of a flexible display is received inside a second housing according to various embodiments. FIG. 3 is a diagram illustrating the state in which a second display area of a flexible display is exposed to the outside of a second housing according to various embodiments.

The state shown in FIG. 2 may be referred to as the state in which a first housing 201 is closed with respect to a second housing 202, and the state shown in FIG. 3 may be referred to as the state in which the first housing 201 is open with respect to the second housing 202. According to an embodiment, a "closed state" or an "opened state" may be referred to as the state in which the electronic device is closed or opened.

Referring to FIGS. 2 and 3, an electronic device 101 may include housings 201 and 202. The housings 201 and 202 may include a second housing 202 and a first housing 201 disposed to be movable relative to the second housing 202. In various embodiments, it may be construed as the structure in which the second housing 202 is disposed to slide on the first housing 201 in the electronic device 101. According to an embodiment, the first housing 201 may be disposed to be able to reciprocate by a certain distance in the illustrated direction, for example, the direction indicated by an arrow ①, with respect to the second housing 202. The configuration of the electronic device 101 in FIGS. 2 and 3 may be entirely or partly the same as the configuration of the electronic device 101 in FIG. 1.

According to various embodiments, the first housing 201 may be referred as, for example, a first structure, a slide portion, or a slide housing, and may be disposed to reciprocate on the second housing 202. According to an embodiment, the first housing 201 may accommodate various electric and electronic components such as a main circuit board or a battery. The second housing 202 may be referred to as, for example, a second structure, a main portion, or a main housing, and may guide the movement of the first housing 101. A portion (e.g., a first display area A1) of the display 203 may be seated on the first housing 201. According to an embodiment, another portion (e.g., a second display area A2) of the display 203 may be received inside the second housing 202 (e.g., a slide-in operation), or may be exposed to the outside of the second housing 202 (e.g., a slide-out operation) according to the movement (e.g., a sliding movement) of the first housing 201 with respect to the second housing 202.

According to various embodiments, the first housing 201 may include a first plate 211 (e.g., the slide plate). The first plate 211 may include a first face (e.g., the first face F1 in FIG. 4) that forms at least a portion of the first plate 211, and a second face F2 that faces the opposite direction of the first face F1. According to an embodiment, the first plate 211 may support at least a portion (e.g., the first display area A1) of the display 203. According to an embodiment, the first housing 201 may include a 1-1st side wall (211a) extending from the first plate 211, a 1-2nd side wall (211b) extending from the 1-1st side wall 211a and the first plate 211, and a 1-3rd side wall (211c) extending from the 1-1st side wall 211a and the first plate 211 to be parallel to the 1-2nd side wall 211b.

According to various embodiments, the second housing 202 may include a second plate (e.g., the second plate 221 in FIG. 4 or a main case), a 2-1st side wall 221a extending from the second plate 221, a 2-2nd side wall 221b extending from the 2-1st side wall 221a and the second plate 221, and a 2-3rd side wall 221c extending from the 2-1st side wall 221a and the second plate 221 to be parallel to the 2-2nd side wall 221b. According to an embodiment, the 2-2nd side wall 221b and the 2-3rd side wall 221c may be formed perpendicular to the 2-1st side wall 221a. According to an embodiment, the second plate 221, the 2-1st side wall 221a, the 2-2nd side wall 221b, and the 2-3rd side wall 221c may be formed to be open on one side (e.g., a front face) in order to accommodate (or surround) at least a portion of the first housing 201. For example, the first housing 201 may be coupled to the second housing 202 to be at least partially wrapped thereby, and may slide in the direction parallel to the first face F1 or the second face F2, for example, in the direction of an arrow ①, while being guided by the second housing 202. According to an embodiment, the second plate 221, the 2-1st side wall 221a, the 2-2nd side wall 221b, and/or the 2-3rd side wall 221c may be integrally formed. According to an embodiment, the second plate 221, the 2-1st side wall 221a, the 2-2nd side wall 221b, and/or the 2-3rd side wall 221c may be formed as separate housings, and may then be combined or assembled.

According to various embodiments, the second plate 221 and/or the 2-1st side wall 221a may cover at least a portion of the flexible display 203. For example, at least a portion of the flexible display 203 may be received inside the second housing 202, and the second plate 221 and/or the 2-1st side wall 221a may cover at least a portion of the flexible display 203 that is received inside the second housing 202.

According to various embodiments, the first housing 201 is able to move relative to the second housing 202 in a first direction (e.g., the direction C)) parallel to the 2-2nd side wall 221b or the 2-3rd side wall 221c so as to switch to the opened state and the closed state, and the first housing 201 may move to be positioned at a first distance from the 2-1st side wall 221a in the closed state and to be positioned at a second distance, which is greater than the first distance, from the 2-1st side wall 221a in the opened state. In various embodiments, the first housing 201 may surround a portion of the 2-1st side wall 221a in the closed state.

According to various embodiments, the electronic device 101 may include a display 203, a key input device 241, a connector hole 243, audio modules 247a and 247b, or camera modules 249a and 249b. Although not shown, the electronic device 101 may further include an indicator (e.g., an LED device) or various sensor modules. The configurations of the display 203, the audio modules 247a and 247b, and the camera modules 249a and 249b in FIGS. 2 and 3 may be entirely or partly the same as the configurations of the display module 160, the audio module 170, and the camera module 180 in FIG. 1.

According to various embodiments, the display 203 may include a first display area A1 and a second display area A2. According to an embodiment, the first display area A1 may be disposed on the first housing 201. For example, the first display area A1 may extend substantially across at least a portion of the first face F1 to be disposed on the first face F1. The second display area A2 may extend from the first display area A1, and may be inserted or received inside the second housing 202 (e.g., a structure) or may be exposed to the outside of the second housing 202 according to the sliding movement of the first housing 201.

According to various embodiments, the second display area A2 may move while being substantially guided by a roller (e.g., the roller 250 in FIG. 4) that is mounted to the first housing 201, thereby being received inside the second housing 202 or a space formed between the first housing 201 and the second housing 202, or being exposed to the outside thereof. According to an embodiment, the second display area A2 may move based on the sliding movement of the first housing 201 in the first direction (e.g., the direction indicated by an arrow ①). For example, while the first housing 201 slides, a portion of the second display area A2 may be deformed into a curved shape at the position corresponding to the roller 250.

According to various embodiments, if the first housing 201 moves from the closed state to the opened state when viewed from above the first plate 211 (e.g., the slide plate), the second display area A2 may be gradually exposed to the outside of the second housing 202, thereby forming a substantially flat surface with the first display area A1. The display 203 may be combined with or disposed adjacent to a touch sensing circuit, a pressure sensor capable of measuring the intensity (pressure) of a touch, and/or a digitizer that detects the magnetic-field type stylus. In an embodiment, the second display area A2 may be at least partially received inside the second housing 202, and a portion of the second display area A2 may be visually exposed to the outside even in the state (e.g., the closed state) shown in FIG. 2. According to an embodiment, regardless of the closed state or the opened state, a portion of the exposed second display area A2 may be positioned on the roller (e.g., the roller 250 in FIG. 4), and a portion of the second display area A2 may maintain a curved shape at the position corresponding to the roller 250.

According to one of various embodiments, the electronic device 200 may include at least one hinge structure 240. The hinge structure 240 may connect the first housing 201 and the second housing 202. For example, the hinge structure 240 may be connected to the first plate 211 and the second plate 221. According to an embodiment, the hinge structure 240 may transfer a driving force for guiding the sliding movement of the first housing 201 to the first housing 201. For example, the hinge structure 240 may include an elastic material (e.g., a spring), and may provide an elastic force in a first direction (e.g., the direction ① in FIG. 3), based on the sliding movement of the first housing 201. According to an embodiment, the hinge structure 240 may be excluded.

According to various embodiments, the key input device 241 may be positioned in one area of the first housing 201. The electronic device 101 may be designed to exclude the illustrated key input device 241, or to include additional key input device(s) depending on the appearance and the usage state. According to an embodiment, the electronic device 101 may include a key input device that is not shown, for example, a home key button or a touch pad disposed around the home key button. According to an embodiment, at least a portion of the key input device 241 may be disposed on the 2-1st side wall 221a, the 2-2nd side wall 221b, or the 2-3rd side wall 221c of the second housing 202.

According to various embodiments, the connector hole 243 may be omitted according to an embodiment, and accommodate a connector (e.g., a USB connector) for transmitting and receiving power and/or data to and from an external electronic device. Although not shown, the electronic device 101 may include a plurality of connector holes 243, and some of the plurality of connector holes 243 may function as connector holes for transmitting and receiving audio signals to and from an external electronic device. Although the connector hole 243 is disposed on the 2-3rd side wall 221c in the illustrated embodiment, the disclosure is not limited thereto, and the connector hole 243 or a connector hole that is not shown may be disposed on the 2-1st side wall 221a or the 2-2nd side wall 221b.

According to various embodiments, the audio modules 247a and 247b may include at least one speaker hole 247a or at least one microphone hole 247b. One of the speaker holes 247a may be provided as a receiver hole for voice calls, and the other thereof may be provided as an external speaker hole. The electronic device 101 may include a microphone to obtain sound, and the microphone may obtain sound outside the electronic device 101 through the microphone hole 247b. According to an embodiment, the electronic device 101 may include a plurality of microphones in order to detect the direction of sound. According to an embodiment, the electronic device 101 may include an audio module in which the speaker hole 247a and the microphone hole 247b are implemented as one hole, or include a speaker (e.g., a piezo speaker) excluding the speaker hole 247a.

According to various embodiments, the camera modules 249a and 249b may include a first camera module 249a and a second camera module 249b. The second camera module 249b may be positioned in the first housing 201, and may photograph a subject in the direction opposite the first display area A1 of the display 203. The electronic device 101 may include a plurality of camera modules 249a and 249b. For example, the electronic device 101 may include at least one of a wide-angle camera, a telephoto camera, and a close-up camera, and, according to an embodiment, may measure the distance to the subject by including an infrared projector and/or an infrared receiver. The camera modules 249a and 249b may include one or more lenses, an image sensor, and/or an image signal processor. The first camera module 249a may be disposed to face in the same direction as the display 203. For example, the first camera module 249a may be disposed around the first display area A1 or in the area overlapping the display 203, and in the case where the first camera module 249a is disposed in the area overlapping the display 203, a subject may be photographed through the display 203.

According to various embodiments, the indicator (not shown) of the electronic device 101 may be disposed in the first housing 201 or the second housing 202, and may include a light-emitting diode, thereby providing state information on the electronic device 101 using a visual signal. The sensor module (not shown) of the electronic device 101 may produce an electric signal or data value corresponding to the internal operation state of the electronic device 101 or the external environmental state. The sensor module, for example, may include a proximity sensor, a fingerprint sensor, or a biometric sensor (e.g., an iris/face recognition sensor or an HRM sensor). In an embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
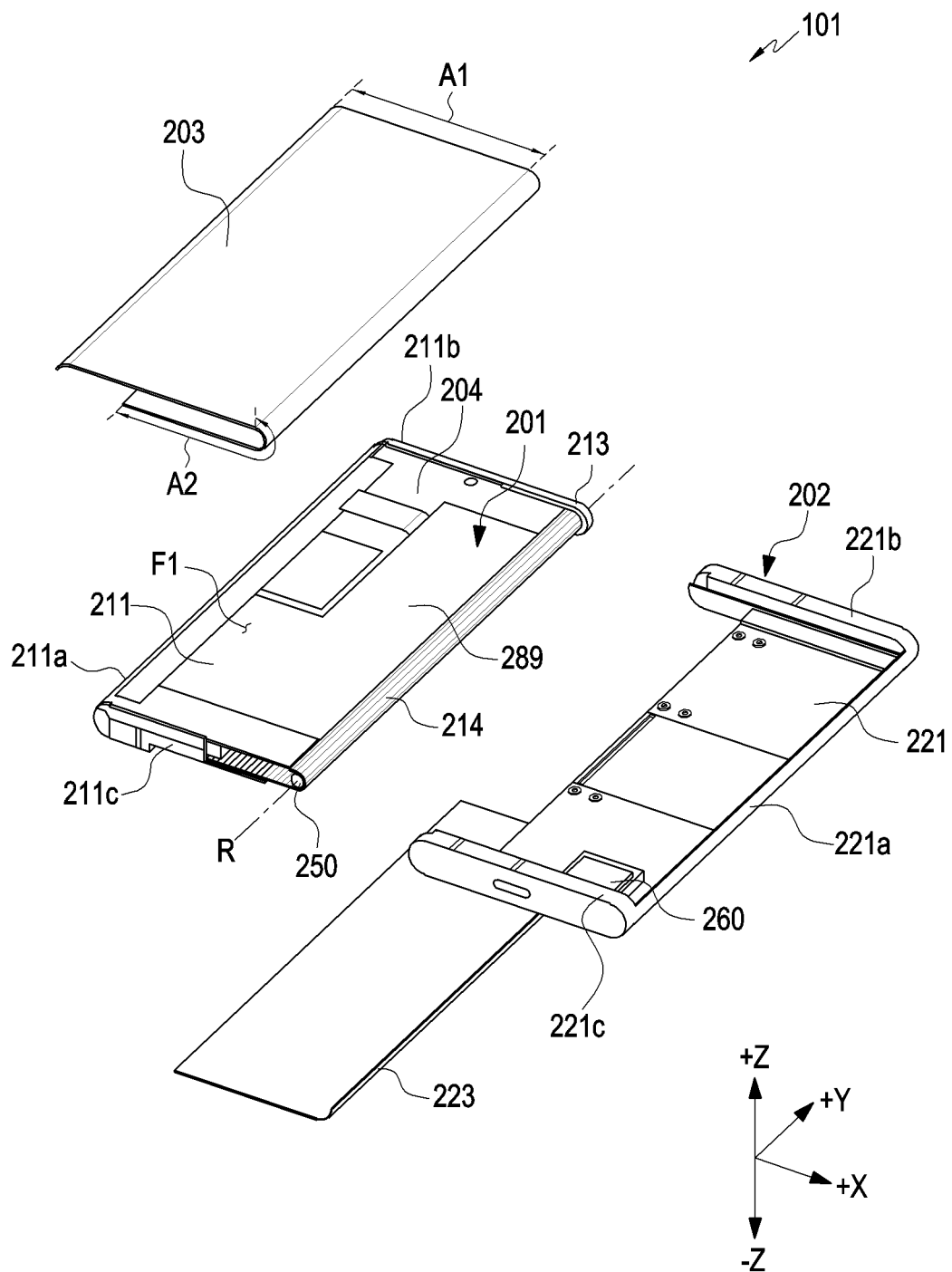
FIG. 4 is an exploded perspective view of an electronic device according to various embodiments.

FIG. 4 is an exploded perspective view of an electronic device according to various embodiments.

Referring to FIG. 4, the electronic device 101 may include a first housing 201, a second housing 202, a display 203 (e.g., a flexible display, a foldable display, or a rollable display), a roller 250, and a multi-joint hinge structure 213. A portion (e.g., a second display area A2) of the display 203 may be received inside the electronic device 101 while being guided by the roller 250. The configurations of the first housing 201, the second housing 202, and the display 203 in FIG. 4 may be entirely or partly the same as the configurations of the first housing 201, the second housing 202, and the display 203 in FIGS. 2 and 3.

According to various embodiments, the first housing 201 may include a first plate 211. The first plate 211 may be mounted to the second housing 202, and may reciprocate linearly in one direction (e.g., the direction of the arrow ① in FIG. 1) while being guided by the second housing 202. According to an embodiment, the first plate 211 may include a first face F1, and the first display area A1 of the display 203 may be substantially mounted to the first face F1 and maintained in a flat shape. According to an embodiment, the first plate 211 may be formed of a metal material and/or a non-metal (e.g., polymer) material. According to an embodiment, the first plate 211 may accommodate components (e.g., a battery 289 (e.g., the battery 189 in FIG. 1) and a circuit board 204) of the electronic device 101.

According to various embodiments, the multi-joint hinge structure 213 may be connected to the first housing 201. For example, as the first housing 201 slides, the multi-joint hinge structure 213 may move relative to the second housing 202. The multi-joint hinge structure 213 may be substantially received inside the second housing 202 in the closed state (e.g., FIG. 2). According to an embodiment, at least a portion of the multi-joint hinge structure 213 may be positioned between the first plate 211 of the first housing 201 and the second plate 221 and/or the 2-1st side wall 221a of the second housing 202, and may move to correspond to the roller 250.

According to various embodiments, the multi-joint hinge structure 213 may include a plurality of bars or rods 214. The plurality of rods 214 may extend straight to be disposed parallel to a rotation axis R of the roller 250, and may be arranged along the direction (e.g., the direction in which the first housing 201 slides) perpendicular to the rotation axis R.

According to various embodiments, each rod 214 may revolve around another adjacent rod 214 while maintaining parallel to another adjacent rod 214. According to an embodiment, as the first housing 201 slides, the plurality of rods 214 may be arranged to form a curved surface, or may be arranged to form a flat surface. For example, as the first housing 201 slides, a portion of the multi-joint hinge structure 213, which faces the roller 250, may form a curved space, and the other portions of the multi-joint hinge structure 213, which do not face the roller 250, may form a flat surface. According to an embodiment, the second display area A2 of the display 203 may be mounted or supported on the multi-joint hinge structure 213, and at least a portion of the second display area A2 may be exposed to the outside of the second housing 202 together with the first display area A1 in the opened state (e.g., FIG. 3). In the state in which the second display area A2 is exposed to the outside of the second housing 202, the multi-joint hinge structure 213 may form a substantially flat surface, thereby supporting or maintaining the second display area A2 to be flat. According to an embodiment, the multi-joint hinge structure 213 may be replaced with a flexible and integral support member (not shown).

According to various embodiments, the second housing 202 may include a third plate 223. According to an embodiment, the third plate 223 may form substantially at least a portion of the second housing 202 or the exterior of the electronic device 101. For example, the third plate 223 may be coupled to the outer surface of the second plate 221. According to an embodiment, the third plate 223 may be formed integrally with the second plate 221. According to an embodiment, the third plate 223 may provide a decorative effect to the exterior of the electronic device 101. The second plate 221 may be manufactured using at least one of metal or polymer, and the third plate 223 may be manufactured using at least one of metal, glass, synthetic resin, or ceramic. According to an embodiment, the second plate 221 and/or the third plate 223 may be manufactured from the material that transmits light at least partially (e.g., an auxiliary display area). For example, in the state in which a portion (e.g., the second display area A2) of the display 203 is received inside the electronic device 101, the electronic device 101 may output visual information using the second display area A2. The auxiliary display area may be a portion of the second plate 221 and/or the third plate 223 at which the display 203 received inside the second housing 202 is positioned.

According to various embodiments, the roller 250 may be disposed inside the first housing 201. For example, the roller 250 may be rotatably mounted to one edge of the first plate 211 of the first housing 201. According to an embodiment, the roller 250 may guide the rotation of the second display area A2 while rotating along the rotation axis R.

According to various embodiments, the electronic device 101 may include a speaker module 260. The speaker module 260 may be disposed in the second housing 202. The configuration of the speaker module 260 in FIG. 4 may be entirely or partly the same as the configuration of the audio module 170 in FIG. 1.

Figure 5:
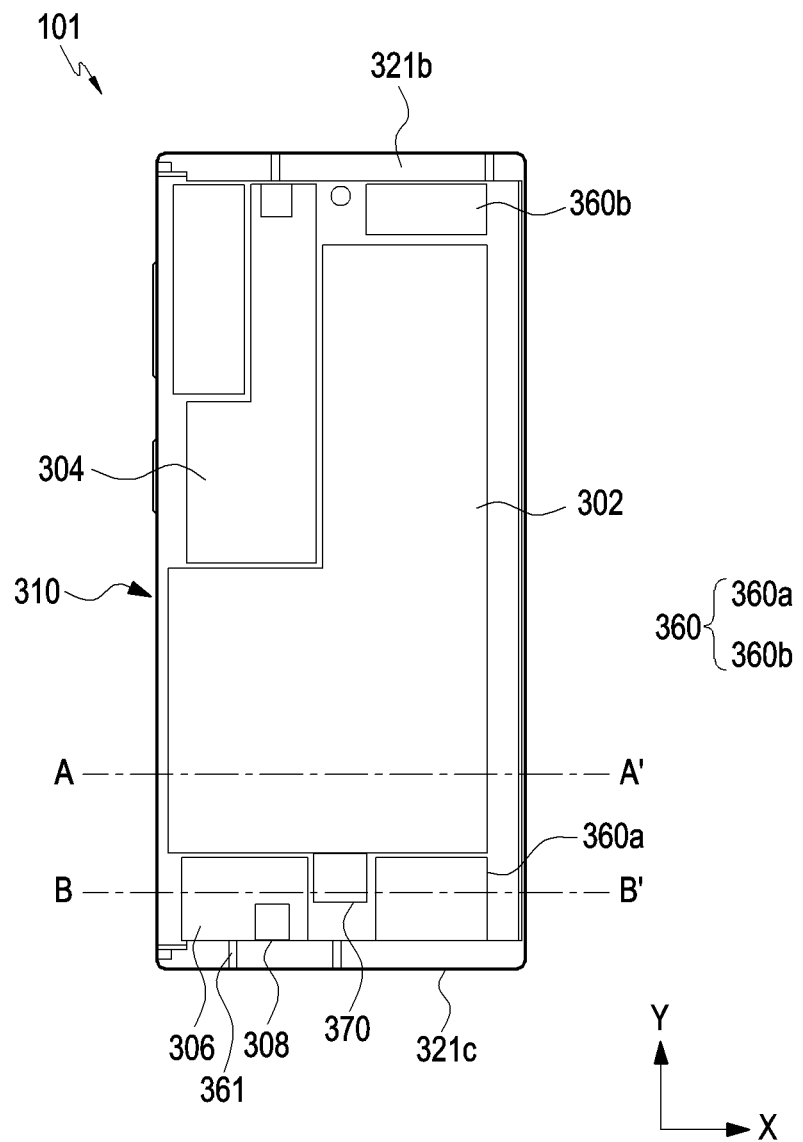
FIG. 5 is a diagram of an electronic device in which a display is projected according to various embodiments.
Figure 6A:
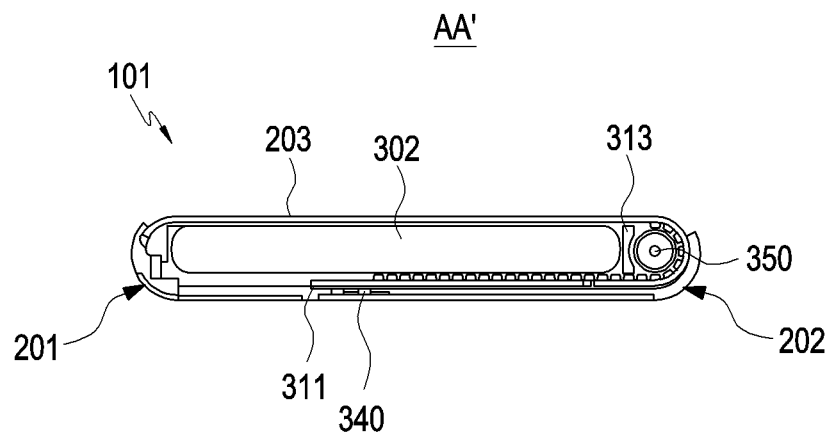
FIG. 6A is a cross-sectional view taken along the line A-A' in FIG. 5 according to various embodiments.
Figure 6B:
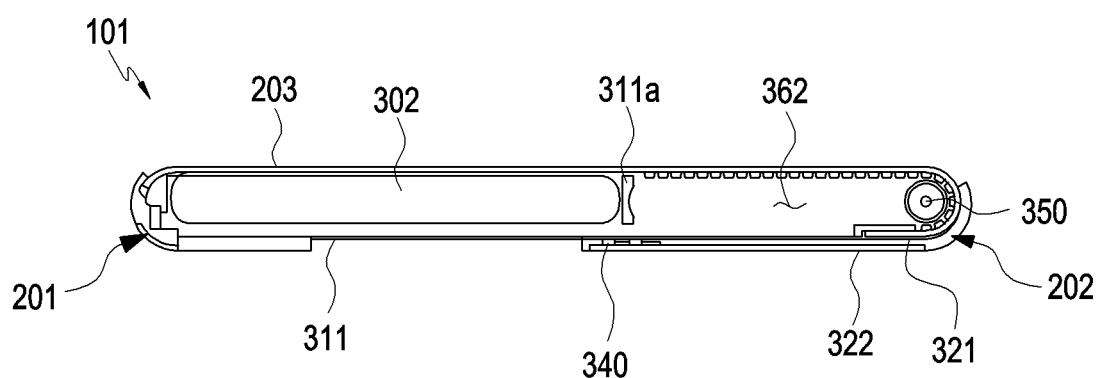
FIG. 6B is a cross-sectional view of the electronic device in the state of being stretched in FIG. 6A according to various embodiments.
Figure 7A:
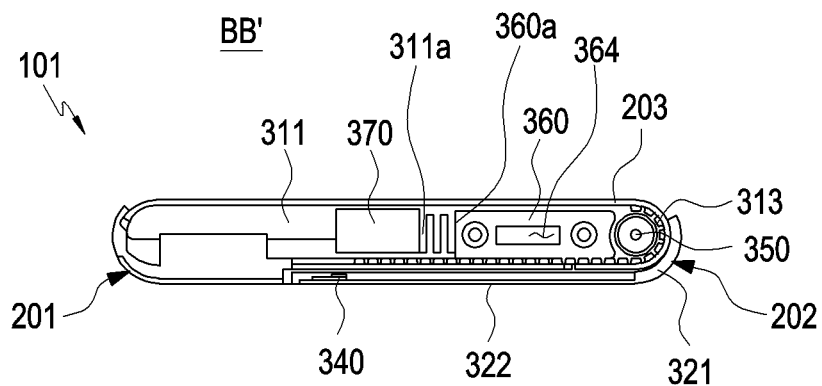
FIG. 7A is a cross-sectional view taken along line B-B' in FIG. 5 according to various embodiments.
Figure 7B:
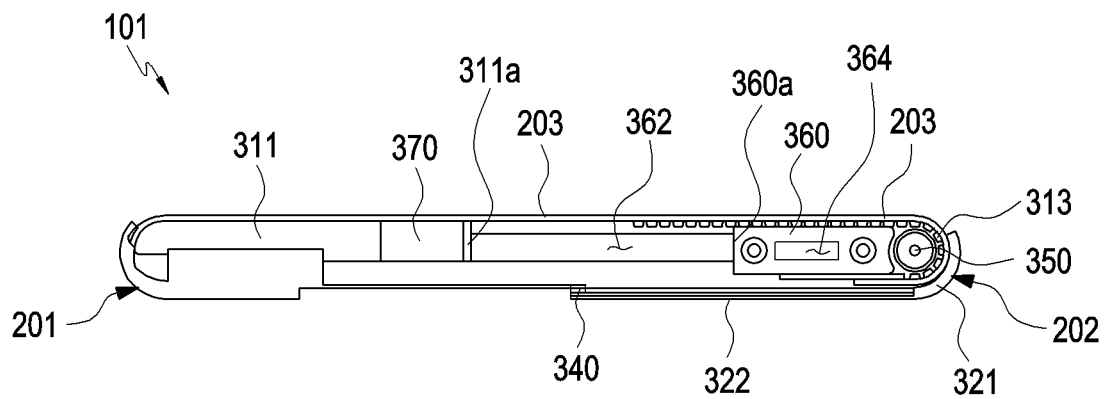
FIG. 7B is a cross-sectional view of the electronic device in the state of being stretched in FIG. 7A according to various embodiments.

FIG. 5 is a diagram illustrating an electronic device in which a display is projected according to various embodiments. FIG. 6A is a cross-sectional view taken along the line A-A' in FIG. 5, and FIG. 6B is a cross-sectional view of the electronic device in the state of being stretched in FIG. 6A according to various embodiments. FIG. 7A is a cross-sectional view taken along line B-B' in FIG. 5, and FIG. 7B is a cross-sectional view of the electronic device in the state of being stretched in FIG. 7A according to various embodiments.

Referring to FIGS. 5, 6A, 6B, 7A, and 7B, a first housing 201 may slide relative to a second housing 202. The configurations of an electronic device 101, a first housing 201, a first plate 311, a multi-joint hinge structure 313, a second housing 202, and a roller 350 in FIGS. 5, 6A, 6B, 7A, and 7B may be entirely or partly the same as the configurations of the electronic device 101, the first housing 201, the first plate 211, the multi-joint hinge structure 213, the second housing 202, and the roller 250 in FIG. 4.

According to various embodiments, the first housing 201 may accommodate components of the electronic device 101. For example, at least one of a battery 302, a main printed circuit board 304 on which a processor (e.g., the processor 120 in FIG. 1) is mounted, an auxiliary circuit board 306 on which a microphone module 308 is mounted, and a motor module 370 may be disposed in the first plate 311 of the first housing 201.

According to various embodiments, the first plate 311 may include a first plate surface 311*a* facing the second housing 202. For example, the first plate surface 311*a* may face in a first direction (e.g., the X-axis direction) in which the first housing 201 slides.

According to various embodiments, the electronic device 101 may include speaker module 360. According to an embodiment, the speaker module 360 may be disposed inside the first housing 201 or the second housing 202. According to an embodiment, the speaker module 360 may include a speaker component (e.g., the acoustic component 411 in FIG. 8B) configured to generate sound, based on an electric signal, and a speaker enclosure (not shown) accommodating the speaker unit. The speaker enclosure may include an emission hole 364 for transmitting a vibration produced by the speaker component to the outside of the electronic device 101. The emission hole 364 may be connected to a speaker hole (e.g., the speaker hole 247*a* in FIG. 2) formed in the 2-2nd side wall 321*b* or the 2-3rd side wall 321*c*. According to an embodiment, the electronic device 101 may include a plurality of speaker modules 360*a* and 360*b*. For example, the electronic device 101 may include a first speaker module 360*a* adjacent to the 2-3rd side wall 321*c* and a second speaker module 360*b* adjacent to the 2-2nd side wall 321*b*.

According to various embodiments, the electronic device 101 may include a resonance space 362 formed inside the electronic device 101. According to an embodiment, a resonance space 362 of the speaker module 360 may be formed inside the electronic device 101, based on the sliding movement of the first housing 201. For example, when the first housing 201 is in the opened state (e.g., FIG. 3), an empty space leading to the resonance hole (not shown) of the speaker module 360 may be formed inside the electronic device 101, resonance of sound may occur in the empty space. According to an embodiment, an empty space formed between the first plate surface 311*a* and the speaker module 360 or the roller 350 may be defined as a resonance space 362.

According to various embodiments, the performance of the speaker module 360 in a low-pitched band (e.g., a band of 200 to 800 Hz) may be improved based on the size (e.g., the volume) of the resonance space 362. For example, the loudness in the low-pitched band may increase based on the size of the resonance space 362.

According to various embodiments, the electronic device 101 may include a motor module 370. According to an embodiment, the motor module 370 may produce a rotational force using the power received from a battery 302. According to an embodiment, the motor module 370 may be disposed in the first plate 311 of the first housing 201, and may be connected to the second plate 321 of the second housing 202. The first housing 201 may slide relative to the second housing 202, based on the rotational force produced by the motor module 370. According to an embodiment, the motor module 370 may be disposed inside the second plate 321 of the second housing 202, and may be connected to the multi-joint hinge structure 313 or the first plate 311.

According to various embodiments, the first housing 310 and the second housing 320 may be connected through a hinge structure 340 (e.g., the hinge structure 240 in FIG. 3). According to an embodiment, the hinge structure 340 disposed on the second plate 321 or a third plate 322 (e.g., the third plate 223 in FIG. 4) may be connected to the first plate 311 of the first housing 310.

According to an embodiment, the motor module 370 may be excluded. For example, the electronic device 300 may be opened or closed by the force provided by a user.

Figure 8A:
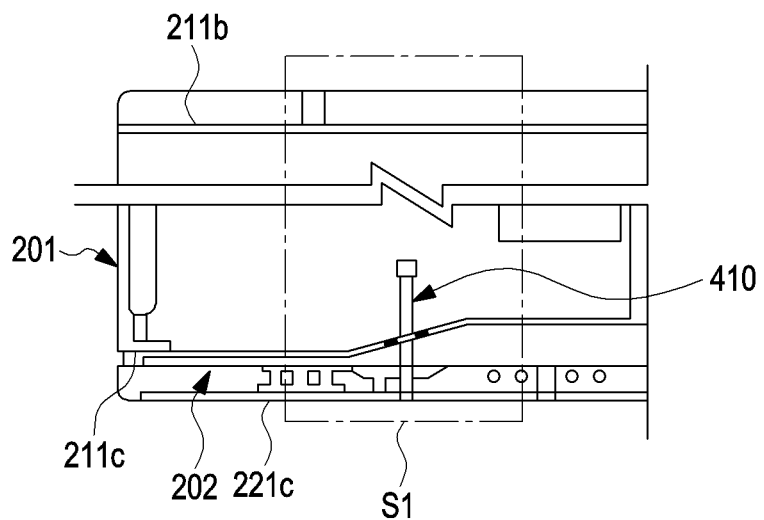
FIG. 8A is a diagram illustrating an acoustic assembly and a surrounding structure thereof in a closed state of a first housing with respect to a second housing according to various embodiments.
Figure 8B:
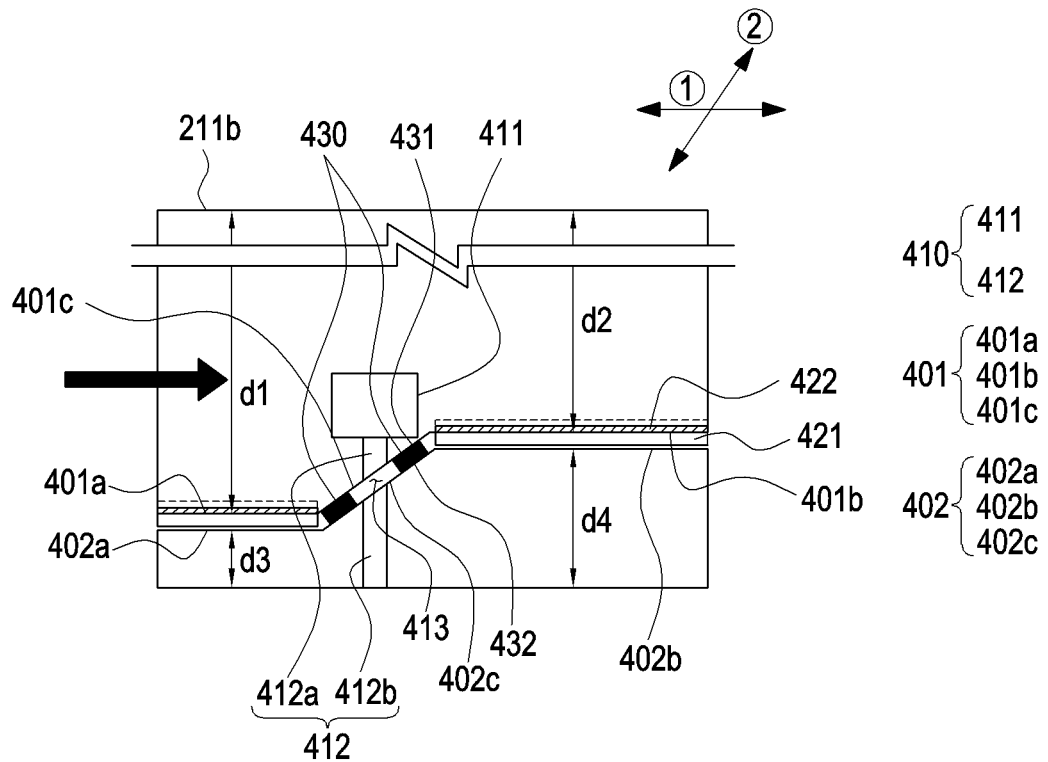
FIG. 8B is a diagram illustrating an acoustic assembly and a surrounding structure thereof by enlarging the area S1 in FIG. 8A according to various embodiments.

FIG. 8A is a diagram illustrating an acoustic assembly and a surrounding structure thereof in a closed state of a first housing with respect to a second housing according to various embodiments. FIG. 8B is a diagram illustrating an acoustic assembly and a surrounding structure thereof by enlarging the area S1 in FIG. 8A according to various embodiments.

Figure 9A:
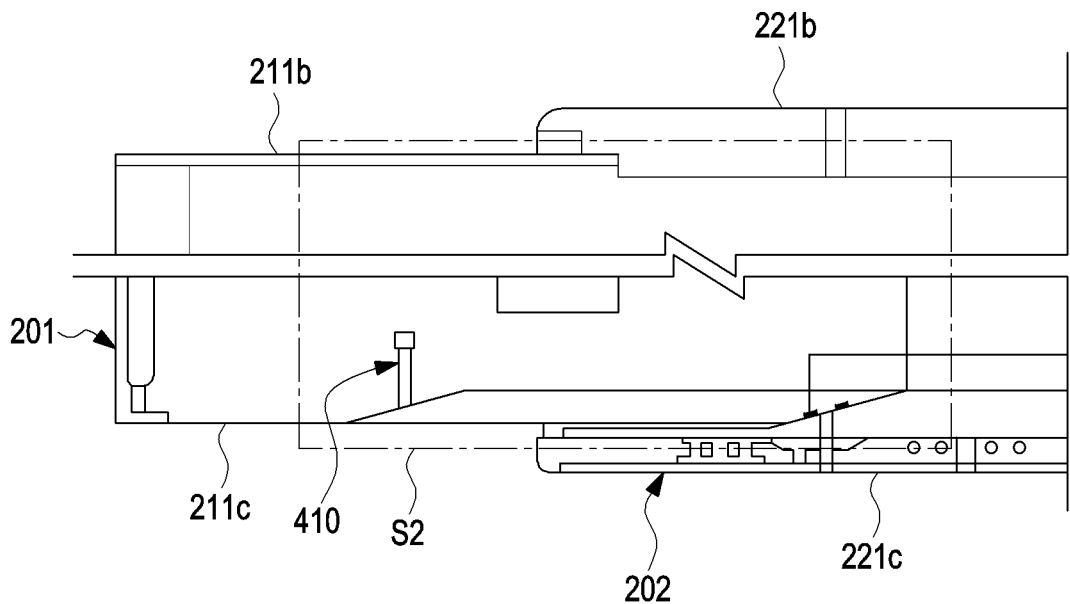
FIG. 9A is a diagram illustrating an acoustic assembly and a surrounding structure thereof in an opened state of a first housing with respect to a second housing according to various embodiments.
Figure 9B:
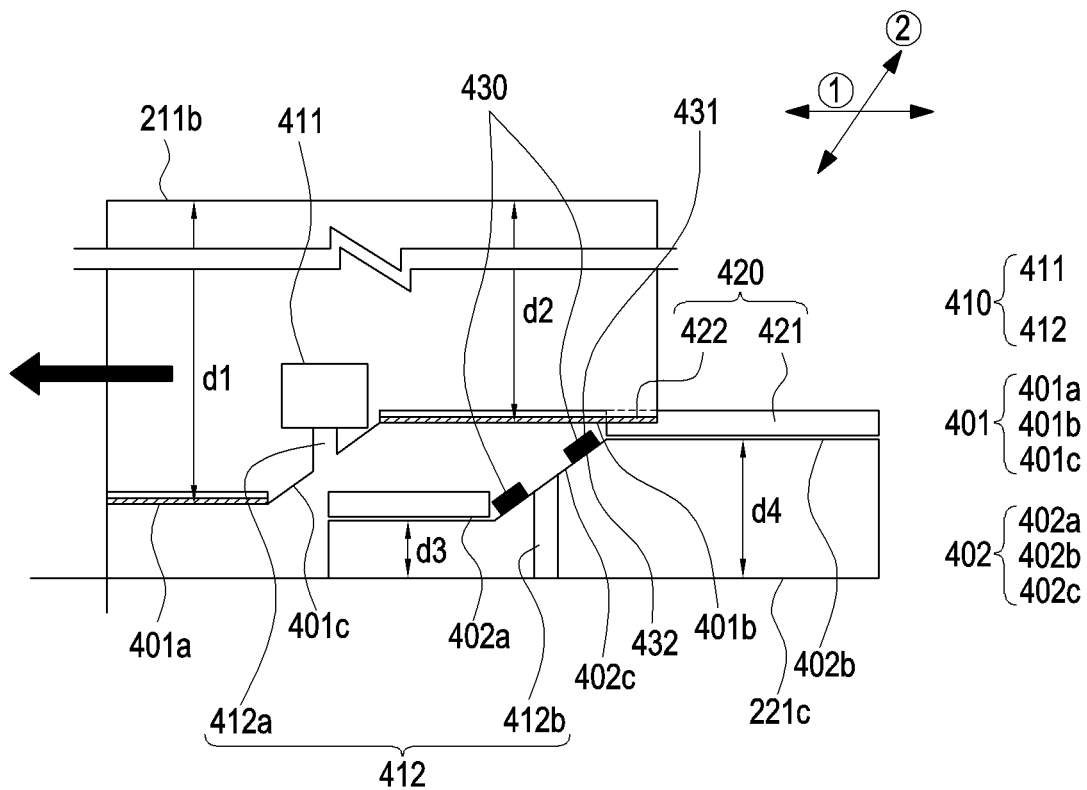
FIG. 9B is a diagram illustrating an acoustic assembly and a surrounding structure thereof by enlarging the area S2 in FIG. 9A according to various embodiments.

FIG. 9A is a diagram illustrating an acoustic assembly and a surrounding structure thereof in an opened state of a first housing with respect to a second housing according to various embodiments. FIG. 9B is a diagram illustrating an acoustic assembly and a surrounding structure thereof by enlarging the area S2 in FIG. 9A according to various embodiments.

According to various embodiments, an electronic device (e.g., the electronic device 101 in FIGS. 1 to 4) may include a first housing (e.g., the first housing 201 in FIGS. 2 to 4), a second housing (e.g., the second housing 202 in FIGS. 2 to 4), a display (e.g., the display 203 in FIGS. 2 to 4), and an acoustic assembly 410. According to an embodiment, the electronic device 101 may further include a slide structure (e.g., slide) 420 and a sealing member (e.g., seal) 430.

In the illustrated embodiment, some of the configurations of the first housing 201 and the second housing 202 have been omitted therefrom in order to clearly indicate a change in the position between the acoustic assembly 410, the slide structure 420, and/or the sealing member 430 according to sliding movement of the first housing 201 with respect to the second housing 202. Referring to FIGS. 8A, 8B, 9A, and 9B, the configurations of the first housing 201 and the second housing 202 may be entirely or partly the same as the configurations of the first housing 201 and the second housing 202 in FIGS. 2 to 4.

According to various embodiments, the first housing 201 may be formed to be slidable relative to the second housing 202. For example, when the first housing 201 is in the closed state with respect to the second housing 202, the first portion 401 of the first housing 201 may combine with the second portion 402 of the second housing 202 while facing each other. As another example, when the first housing 201 is in the opened state with respect to the second housing 202, the first portion 401 of the first housing 201 may be spaced apart from the second portion 402 of the second housing 202.

According to various embodiments, the first portion 401 of the first housing 201 may be an edge portion of the first housing 201, and may be adjacent to the area where the acoustic assembly 410 is disposed. For example, in the case where the acoustic assembly 410 is disposed adjacent to a lower portion (e.g., the 1-3rd side wall 211*c*) of the first housing 201, the first portion 401 may be at least a portion of the edge of the lower portion (e.g., the 1-3rd side wall 211*c*) of the first housing 201. As another example, in the case where the acoustic assembly 410 is disposed adjacent to an upper portion (e.g., the 1-2nd side wall 211*b* in FIG. 4) of the first housing 201, the first portion 401 may be at least a portion of the edge of the upper portion (e.g., the 1-2nd side wall 211*b* of FIG. 4) of the first housing 201.

According to an embodiment, the first portion 401 positioned on the 1-3rd side wall 211*c* of the first housing 201 may include a plurality of areas formed to have different lengths from the 1-2nd side wall 211*b* of the first housing 201. For example, it may include a 1-1st portion 401*a* having a first length d1 from the 1-2nd side wall 211*b*, a 1-2nd portion 401*b* having a second length d2 from the 1-2nd side wall 211*b*, and a 1-3rd portion 401*c* having a length between the 1-1st portion 401*a* and the 1-2nd portion 401*b* from the 1-2nd side wall 211*b* and disposed between the 1-1st portion 401*a* and the 1-2nd portion 401*b*. The 1-3rd portion 401*c* may include a portion that gradually increases or decreases from the 1-2nd side wall 211*b*.

According to an embodiment, when viewed from above the first housing 201, the 1-1st portion 401*a* may be a left area of the 1-2nd side wall 211*b* of the first housing 201, and the 1-2nd portion 401*b* may be a right area of the 1-2nd side wall 211*b* of the first housing 201. As another example, the first length d1 may be greater than the second length d2. The 1-3rd portion 401*c* may include a portion having a slope and have one end thereof extending from the 1-1st portion 401*a* and the opposite end thereof extending from the 1-2nd portion 401*b*. For example, the 1-3rd portion 401*c* may have a specified slope or include a side portion including a curved surface in a part thereof. As another example, the 1-3rd portion 401*c* may be formed in a diagonal shape, and one end thereof may have a first length d1 from the upper end and the opposite end thereof may have a second length d2 from the upper end.

According to various embodiments, the second portion 402 of the second housing 202 may be an edge portion of the second housing 202, and correspond to the first portion 401 of the first housing 201. For example, in the case where the first portion 401 is disposed adjacent to a lower portion (e.g., the 1-3rd side wall 211*c*) of the first housing 201, the second portion 402 may be disposed adjacent to a lower portion (e.g., the 2-3rd side wall 221*c*) of the second housing 202. As another example, in the case where the first portion 401 is disposed adjacent to an upper portion (e.g., the 1-2nd side wall 211*b* in FIG. 4) of the first housing 201, the second portion 402 may be disposed adjacent to an upper portion (e.g., the 2-2nd side wall 221*b* in FIG. 4) of the second housing 202.

According to an embodiment, the second portion 402 located adjacent to the 2-3rd side wall 221*c* of the second housing 202 may include a plurality of areas formed to have different lengths from the 2-3rd side wall 221*c* of the second housing 202. For example, it may include a 2-1st portion 402*a* having a third length d3 from the 2-3rd side wall 221*c*, a 2-2nd portion 402*b* having a fourth length d4 from 2-3rd side wall 221*c*, and a 2-3rd portion 402*c* having a length between the 2-1st portion 402*a* and the 2-2nd portion 402*b* from the 2-3rd side wall 221*c* and disposed between the 2-1st portion 402*a* and the 2-2nd portion 402*b*. The 2-3rd portion 402*c* may include a portion that gradually increases or decreases from the lower end. As another example, when the first housing 201 is in the closed state with respect to the second housing 202, the 2-1st portion 402*a* of the second housing 202 may be disposed to face the 1-1st portion 401*a* of the first housing 201, the 2-2nd portion 402*b* of the second housing 202 may be disposed to face the 1-2nd portion 401*b* of the first housing 201, and the 2-3rd portion 402*c* of the second housing 202 may be disposed to face the 1-3rd portion 401*c* of the first housing 201.

According to an embodiment, when viewed from above the second housing 202, the 2-1st portion 402*a* may be an area adjacent to the left area of the 2-3rd side wall 221*c* of the second housing 202, and the 2-2nd portion 402*b* may be an area adjacent to the right side of the 2-3rd side wall 221*c* of the second housing 202. According to an embodiment, the third length d3 may be smaller than the fourth length d4. The 2-3rd portion 402*c* may include a portion having a slope, and have one end extending from the 2-1st portion 402*a* and the opposite end extending from the 2-2nd portion 402*b*. For example, the 2-3rd portion 402*c* may have a specified slope or include a side portion including a curved surface in a part thereof. As another example, the 2-3rd portion 402*c* may be formed in a diagonal shape, and one end thereof has a third length d3 from the lower end and the opposite end thereof has a fourth length d4 from the lower end.

According to an embodiment, when the first housing 201 slides to switch from the closed state to the opened state with respect to the second housing 202, the 1-3rd portion 401*c* of the first housing 201 and the 2-3rd portion 402*c* of the second housing 202 may remain parallel, and the separation distance between the 1-3rd portion 401*c* and the 2-3rd portion 402*c* may be increased. According to an embodiment, when the first housing 201 slides to switch from the opened state to the closed state with respect to the second housing 202, the 1-3rd portion 401*c* of the first housing 201 and the 2-3rd portion 402*c* of the second housing 202 may remain parallel, and the separation distance between the 1-3rd portion 401*c* and the 2-3rd portion 402*c* may be reduced.

According to various embodiments, the acoustic assembly 410 may be disposed inside the first housing 201, and include an acoustic component 411 and at least one pipe 412 extending from the end of the acoustic component 411 to the end of the first housing 201 and/or the second housing 202. According to an embodiment, the acoustic component 411 may be located adjacent to the first portion 401 of the first housing 201, and may be, for example, an audio component such as a speaker component and/or a microphone component (e.g., acoustic circuitry).

According to an embodiment, the pipe 412 may include a first pipe 412*a* extending from the acoustic component 411 to the 1-3rd portion 401*c* of the first housing 201, and a second pipe 412*b* extending from a lower portion (e.g., the 2-3rd side wall 221*c*) of the second housing 202 to the 2-3rd portion 402*c* of the second housing 202. The first pipe 412*a* and the second pipe 412*b* may be separated or connected depending on whether the first housing 201 is in the opened state or closed state with respect to the second housing 202.

According to an embodiment, since the first pipe 412*a* is formed from the acoustic component 411 to the 1-3rd portion 401*c* of the first housing 201, the end thereof may be an opening having a slope corresponding to the 1-3rd portion 401*c*. For example, the end of the first pipe 412*a* may be a portion of an opening obtained by cutting a cylinder into a diagonal shape. According to an embodiment, the second pipe 412*b* may be formed to pass through a portion of the second housing 202, and since one end thereof is formed in the 2-3rd portion 402*c* of the second housing 202, it may be an opening having a slope corresponding to the 2-3rd portion 402*c*. For example, one end of the second pipe 412*b* may be a portion of an opening obtained by cutting a cylinder into a diagonal shape. The end of the first pipe 412*a* and the end of the second pipe 412*b* may have the same slope connectable to each other.

According to an embodiment, the first pipe 412*a* and the second pipe 412*b* may be connected when the first housing 201 is in the closed state with respect to the second housing 202 (or in the state in which the first housing 201 is accommodated in the second housing 202). For example, the first pipe 412*a* and the second pipe 412*b* may be disposed to face each other, and may be connected through a sealed connection space 413 positioned between the first pipe 412*a* and the second pipe 412*b*. As another example, the diagonally shaped end of the first pipe 412*a* and the diagonally shaped end of the second pipe 412*b* may be disposed to face each other, and a connection space 413 between the first pipe 412a and the second pipe 412b may be surrounded by a sealing member 430 to be sealed. Accordingly, a signal transmitted from the acoustic component 411 or a signal received from the outside may be stably transmitted through the first pipe 412a, the connection space 413, and the second pipe 412b.

According to an embodiment, the first pipe 412a and the second pipe 412b may be separated when the first housing 201 is in the opened state with respect to the second housing 202. For example, the first pipe 412a may slide together with the first housing 201 with respect to the second housing 202, and the diagonally shaped end of the first pipe 412a may be directly connected to the outside. Accordingly, a signal transmitted from the acoustic component 411 or a signal received from the outside may be stably transmitted through the first pipe 412a.

According to various embodiments, the first housing 201 and the second housing 202 may include a slide structure 420 that enables sliding movement of the first housing 201 relative to the second housing 202. For example, a guide portion 421 for guiding the sliding movement of the first housing 201 may be formed in one area (an edge portion) of the second housing 202, and a slide portion 422 movable along the guide portion 421 may be formed in one area (an edge portion) of the first housing 201. For example, the guide portion 421 of the second housing 202 may be provided in the shape of a slide rail, and may be disposed along the 2-1st portion 402a and the 2-2nd portion 402b of the second housing 202. As another example, the slide portion 422 of the first housing 201 may have a shape corresponding to the guide portion 421, and may be provided in a structure including a protrusion or recess that moves in engagement with the slide rail. The slide portion 422 may be disposed along the 1-1st portion 401a and the 1-2nd portion 401b of the first housing 201. According to the illustrated embodiment, although the slide portion 422 is formed in the first housing 201 and the guide portion 421 is formed in the second housing 202, the disclosure is not limited thereto, and the guide portion may be formed in the first housing 201 and the slide portion may be formed in the second housing 202, or the sliding movement may be designed in various shapes other than the rail shape.

According to various embodiments, a sealing member 430 may be disposed between the 1-3rd portion 401c of the first housing 201 and/or the 2-3rd portion 402c of the second housing 202. The sealing member 430 may seal the pipe 412 of the acoustic assembly 410 except for the opening thereof leading to the outside, and provide a partitioned space between the first pipe 412a and the second pipe 412b. For example, the sealing member 430 may be provided to surround the connection space 413 between the first pipe 412a and the second pipe 412b.

According to an embodiment, in the closed state of the first housing 201 with respect to the second housing 202, the first pipe 412a of the first housing 201 and the second pipe 412b of the second housing 202 may be disposed to face each other. The diagonally shaped end of the first pipe 412a and the diagonally shaped end of the second pipe 412b may be manufactured to have shapes corresponding to each other, and may be positioned parallel to each other. The first pipe 412a and the second pipe 412b may be spaced apart from each other by a specified distance for sliding movement of the first housing 201 with respect to the second housing 202. The sealing member 430 may be designed in the shape of a closed loop to seal the spaced space, so that the space in which the pipe 412 is formed may be separated from the surrounding space. For example, the accommodation space 413 formed by the sealing member 430 may have a size corresponding to the openings (or diameters) of the first pipe 412a and the second pipe 412b. The sealing member 430 may contain an elastic material to come into close contact with and/or overlap the 1-3rd portion 401c of the first housing 201 and the 2-3rd portion 402c of the second housing 202.

According to an embodiment, the first pipe 412a of the first housing 201 and the second pipe 412b of the second housing 202 may be spaced apart from each other in the opened state of the first housing 201 with respect to the second housing 202. The pipe 412 for sound of the acoustic assembly 410 may utilize only the first pipe 412a, and the sealing member 430 may be maintained to be disposed in the 2-3rd portion 402c of the second housing 202. However, the position of the sealing member 430 is not limited thereto, and it may be fixedly disposed in the 1-3rd portion 401c of the first housing 201.

According to an embodiment, the sealing member 430 may include a first surface 431 to be disposed in contact with the 1-3rd portion 401c of the first housing 201 and a second surface 432 to be disposed in contact with the 2-3rd portion 402c of the second housing 202. For example, when the sealing member 430 is fixedly disposed in the 2-3rd portion 402c of the second housing 202, the first surface 431 may be disposed in the direction (e.g., a second direction (the direction ②)) (e.g., a direction having a specified slope with respect to the movement direction) that is different from the sliding movement direction (e.g., a first direction (the direction ①)) of the first housing 201 relative to the second housing 202. According to an embodiment, when the first housing 201 slides relative to the second housing 202 to switch to the opened state, the first surface 431 of the sealing member 430 may form an increasing separation distance while maintaining the state of being parallel to the 1-3rd portion 401c of the first housing 201. According to an embodiment, when the first housing 201 slides relative to the second housing 202 to switch to the closed state, the first surface 431 of the sealing member 430 may form a decreasing separation distance while maintaining the state of being parallel to the 1-3rd portion 401c of the first housing 201. Accordingly, in the case of the sliding movement of the first housing 201 relative to the second housing 202, the 2-3rd portion 402c and the first surface 431 of the sealing member 430 come into contact with each other at upper and lower points, so the sealing member 430 may remain in a stable state without being pushed or damaged by the 1-3rd portion 401c of the first housing 201. As another example, in the case where the sealing member 430 is fixedly disposed in the 1-3rd portion 401c of the first housing 201, the second surface 432 may be disposed in a direction (e.g., the second direction (direction ②)) that is different from the sliding movement direction (e.g., the first direction (direction ①)) of the first housing 201 relative to the second housing 202. Accordingly, in the case of the sliding movement of the first housing 201 relative to the second housing 202, the 2-3rd portion 402c and the second surface 432 of the sealing member 430 come into contact with each other at upper and lower points, so the sealing member 430 may remain in a stable state without being pushed or damaged by the 2-3rd portion 402c of the second housing 202.

Figure 10:
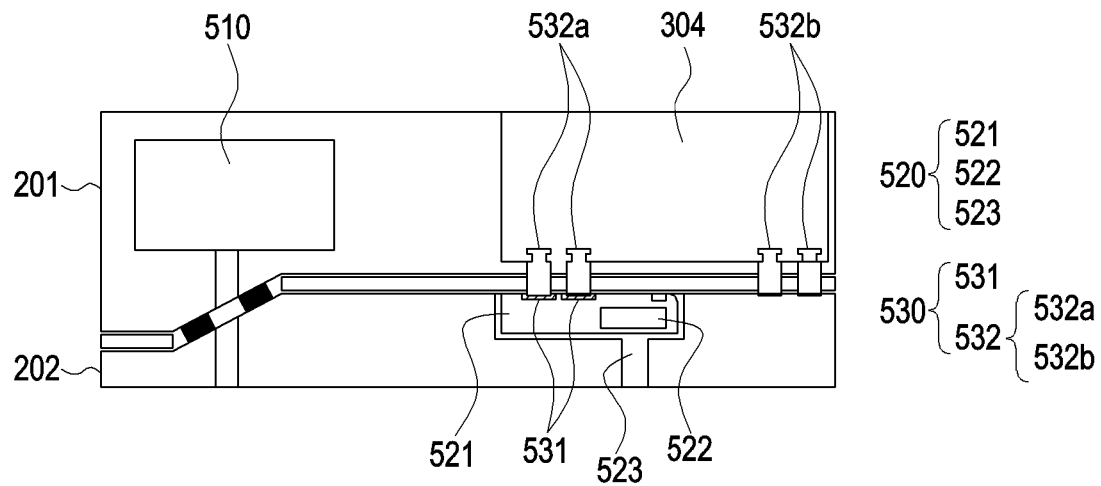
FIG. 10 is a diagram illustrating an acoustic assembly and the surrounding structure thereof in a closed state of a first housing with respect to a second housing according to various embodiments.

FIG. 10 is a diagram illustrating an acoustic assembly and a surrounding structure thereof in a closed state of a first housing with respect to a second housing according to various embodiments.

Figure 11:
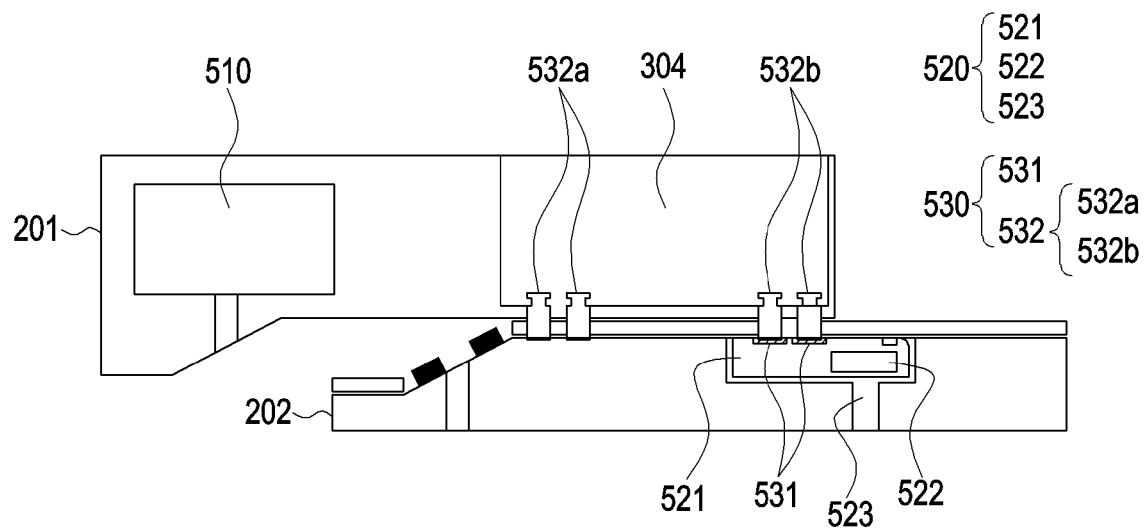
FIG. 11 is a diagram illustrating an acoustic assembly and the surrounding structure thereof in an opened state of a first housing with respect to a second housing according to various embodiments.

FIG. 11 is a diagram illustrating an acoustic assembly and a surrounding structure thereof in an opened state of a first housing with respect to a second housing according to various embodiments.

According to various embodiments, an electronic device (e.g., the electronic device 101 in FIGS. 1 to 4) may include a first housing (e.g., the first housing 201 in FIGS. 2 to 4), a second housing (e.g., the second housing 202 in FIGS. 2 to 4), a first acoustic assembly 510, and a second acoustic assembly 520. According to an embodiment, the electronic device 101 may further include a connection terminal structure 530.

In the illustrated embodiment, in order to clearly show a change in position between the second acoustic assembly 520 and the connection terminal structure 530 according to the sliding movement of the first housing 201 with respect to the second housing 202, some of the configurations of the first housing 201 and the second housing 202 were omitted. Referring to FIGS. 10 and 11, the configurations of the first housing 201 and the second housing 202 may be entirely or partly the same as the configurations of the first housing 201 and the second housing 202 in FIGS. 2 to 4. The configurations of the first acoustic assembly 510 may be entirely or partly the same as the configurations of the acoustic assembly 410 in FIGS. 8A to 9B.

According to various embodiments, the first housing 201 may be formed to slide with respect to the second housing 202. For example, in the closed state of the first housing 201 with respect to the housing 202, a first portion 401 of the first housing 201 may combine with the second portion 402 of the second housing 202 while facing each other. As another example, in the opened state of the first housing 201 with respect to the second housing 202, the first portion 401 of the first housing 201 may be spaced apart from the second portion 402 of the second housing 202.

According to various embodiments, the second acoustic assembly 520 may be located near an edge of the electronic device 101, and may be spaced apart from the first acoustic assembly 510. For example, the first acoustic assembly 510 may be a speaker, and the second acoustic assembly 520 may be a microphone.

According to various embodiments, the second acoustic assembly 520 may be disposed inside the second housing 202, and include a flexible printed circuit board 521, an acoustic component 522 mounted on the flexible printed circuit board 521, at least one pipe 523 extending from an end of the acoustic component 522 to an edge of the lower end of the second housing 202, and a first connection terminal 531 disposed to face the first housing 201. The first connection terminal 531 may be disposed on the edge of the flexible printed circuit board 521, and may be designed in the form of a connection pad (or a connection pin (e.g., a c-clip)) to apply power to the acoustic component 522. According to an embodiment, the acoustic component 522 may be located adjacent to the second portion 402 of the second housing 202, and obtain sound from the outside of the electronic device 101 through a pipe 523 leading to the outside.

According to an embodiment, one area of the flexible printed circuit board 521 of the second acoustic assembly 520 may be positioned adjacent to the second portion 402 of the second housing 202. A first connection terminal 531 may be disposed in the one area, and the flexible printed circuit board 521 may be electrically connected to a main printed circuit board 304 disposed inside the first housing 201 through a second connection terminal 532, thereby applying power to the second acoustic assembly 520.

According to an embodiment, a plurality of second connection terminals 532 may be disposed at the end of the main printed circuit board 304. Each second connection terminal 532 may be disposed at a specific position to be connected to the first connection terminal 531 of the second acoustic assembly 520 and to consistently apply power thereto irrespective of the sliding movement of the first housing 201 with respect to the second housing 202.

According to an embodiment, the plurality of second connection terminals 532 may be disposed on the edge of the lower end of the first housing 201, and the respective second connection terminals 532 may be spaced apart from each other by a specified distance. The second connection terminal 532 may be formed to include a conductive material such as a ball bearing type or a pogo pin type. For example, a 2-1st connection terminal 532a among the plurality of second connection terminals 532 may be disposed at a position corresponding to the first connection terminal 531 located in the second housing 202 in the closed state of the first housing 201 with respect to the second housing 202. Accordingly, in the closed state of the first housing 201 with respect to the second housing 202, the 2-1st connection terminal 532a may come into contact with the first connection terminal 531, and electrically connect the main printed circuit board 304 and the second acoustic assembly 520. As another example, a 2-2nd connection terminal 532b among the plurality of second connection terminals 532 may be disposed in a position corresponding to the first connection terminal 531 located in the second housing 202 in the opened state of the first housing 201 with respect to the second housing 202. Accordingly, in the opened state of the first housing 201 with respect to the second housing 202, the 2-2nd connection terminal 532b may come into contact with the first connection terminal 531, and electrically connect the main printed circuit board 304 and the second acoustic assembly 520.

According to the illustrated embodiment, although the positions of the second connection terminals 532 in two modes corresponding to the closed state and the opened state of the first housing 201 with respect to the second housing 202 have been described, the disclosure is not limited thereto. For example, a ball bearing type second connection terminal may be disposed in the slide structure area of the first housing 201 and the second housing 202 in order to apply power to the second acoustic assembly 520 in the operation in which the first housing 201 slides relative to the second housing 202 to switch from the closed state to the opened state.

An electronic device (e.g., the electronic device 101 in FIGS. 1 to 4) according to various embodiments of the disclosure may include: a first housing (e.g., the first housing 201 in FIGS. 2 to 4), a second housing (e.g., the second housing 202 in FIGS. 2 to 4) accommodating at least a portion of the first housing and configured to guide sliding movement of the first housing, and an acoustic assembly (e.g., the acoustic assembly 410 in FIG. 8B) including an acoustic component comprising acoustic circuitry (e.g., the acoustic component 411 in FIG. 8B) disposed inside the first housing, a first pipe (e.g., the first pipe 412a in FIG. 8B) extending from the acoustic component toward a first end (e.g., the 1-3rd portion 401c in FIG. 8B) of the first housing, and a second pipe (e.g., the second pipe 412b in FIG. 8B) extending from an edge portion of the second housing to a second end (e.g., the 2-3rd portion 402c in FIG. 8B) of the second housing facing the first housing.

The first end of the first housing or the second end of the second housing for connecting the first pipe and the second pipe when the first housing is accommodated in the second housing may be provided in a shape having a specified slope with respect to the edge portion of the second housing.

According to various example embodiments, the electronic device may further include a flexible display (e.g., the display 203 in FIGS. 2 to 4) including a first display area disposed on the first housing and a second display area extending from the first display area and configured such that the second display area may move to the inside or outside of the second housing, based on the sliding movement of the first housing.

According to various example embodiments, the first pipe may include an opening having a diagonal shape corresponding to the first end, and the second pipe may include an opening having a diagonal shape corresponding to the second end.

According to various example embodiments, the first pipe may be disposed inside the first housing, and the second pipe may be formed to pass through the second housing.

According to various example embodiments, based on the first housing sliding relative to the second housing, the first end of the first housing and the second end of the second housing may remain parallel, and a separation distance therebetween may decrease or increase.

According to various example embodiments, based on the first housing being in a closed state with respect to the second housing, the first pipe and the second pipe may be disposed to face, and may be connected through, a closed connection space (e.g., the connection space 413 in FIG. 8B) located between the first pipe and the second pipe.

According to various example embodiments, based on the first housing being in an opened state with respect to the second housing, as the first pipe slides along with the first housing, the first pipe and the second pipe may be disposed to be separate.

According to various example embodiments, the electronic device may further include a sealing member (e.g., the sealing member 430 in FIG. 8B) disposed at the first end of the first housing or at the second end of the second housing.

According to various example embodiments, the sealing member may be provided in a closed loop shape and configured to seal a separation space between the first pipe and the second pipe based on the first housing being in a closed state with respect to the second housing.

According to various example embodiments, an accommodating space formed by the sealing member may be formed to correspond to the sizes of diagonally shaped openings of the first pipe and the second pipe.

According to various example embodiments, based on the first housing sliding relative to the second housing to switch to an opened state, one surface of the sealing member may remain parallel to the first end of the first housing and form an increasing separation distance.

According to various example embodiments, based on the first housing sliding relative to the second housing to switch to a closed state, one surface of the sealing member may remain parallel to the first end of the first housing and form a decreasing separation distance.

According to various example embodiments, the sealing member may include an elastic material.

According to various example embodiments, an area adjacent to the second end of the second housing may have a guide portion (e.g., the guide portion 421 in FIG. 8B) configured to guide sliding movement of the first housing, and an area adjacent to the second end of the first housing may have a slide portion (e.g., the slide portion 422 in FIG. 8B) configured to move along the guide portion.

According to various example embodiments, the guide portion of the second housing may be provided in a shape of a slide rail, and the slide portion of the first housing may have a shape corresponding to the guide portion and have a structure in a protrusion or recess shape configured to move in engagement with the slide rail.

According to various example embodiments, the electronic device may further include: a second acoustic assembly (e.g., the second acoustic assembly 520 in FIG. 10) disposed inside the second housing and spaced apart from the acoustic assembly. The second acoustic assembly may include a flexible printed circuit board (e.g., the flexible printed circuit board 521 in FIG. 10), a second acoustic component comprising acoustic circuitry (e.g., the acoustic component 522 in FIG. 10) mounted on the flexible printed circuit board, at least one second pipe (e.g., the pipe 523 in FIG. 10) extending from an end of the second acoustic component to an edge portion of the second housing, and a first connection terminal (e.g., the first connection terminal 531 in FIG. 10) disposed to face the first housing on the flexible printed circuit board.

According to various example embodiments, the electronic device may further include a main printed circuit board (e.g., the main printed circuit board 304 in FIG. 10) disposed inside the first housing, and a plurality of second connection terminals (e.g., the second connection terminal 532 in FIG. 10) disposed on the main printed circuit board. A first second connection terminal (e.g., the 2-1st connection terminal 532*a* in FIG. 10) among the second connection terminals may be electrically connected to the first connection terminal in an opened state of the first housing with respect to the second housing, and a second second connection terminal (e.g., the 2-2nd connection terminal 532*b* in FIG. 10) among the second connection terminals may be spaced apart from the first second connection terminal and may be electrically connected to the first connection terminal in a closed state of the first housing with respect to the second housing.

An electronic device according to various example embodiments of the disclosure may include: a first housing, a second housing accommodating at least a portion of the first housing and configured to guide sliding movement of the first housing, a flexible display including a first display area disposed on the first housing and a second display area extending from the first display area and configured such that the second display area may move to the inside or outside of the second housing, based on the sliding movement of the first housing, an acoustic assembly including an acoustic component comprising acoustic circuitry disposed inside the first housing, a first pipe extending from the acoustic component toward a first end of the first housing, and a second pipe extending from an edge portion of the second housing to a second end of the second housing facing the first housing, and a sealing member disposed between the first end of the first housing or the second end of the second housing. When the first housing is accommodated inside the second housing, the ends of the first pipe and the second pipe facing each other may be formed in a diagonal shape, and may be connected by an accommodation space formed by the sealing member.

According to various example embodiments, based on the first housing sliding relative to the second housing, the first end of the first housing and the second end of the second housing may remain parallel, and a separation distance therebetween may decrease or increase.

According to various example embodiments, based on the first housing being in an opened state with respect to the second housing, as the first pipe slides along with the first housing, the first pipe and the second pipe may be disposed to be separate.

According to various example embodiments, the sealing member may be fixedly disposed at the first end of the first housing or the second end of the second housing.

The electronic device including the acoustic assembly of the various example embodiments of the disclosure described above is not limited to the above-described embodiments and drawings, and it will be apparent to those skilled in the art to which the disclosure pertains that the display can be substituted, modified, and changed in various ways within the technical scope of the disclosure.

What is claimed is:

1. An electronic device comprising:
a first housing;
a second housing accommodating at least a portion of the first housing and configured to guide sliding movement of the first housing; and
an acoustic assembly comprising an acoustic component comprising acoustic circuitry disposed inside the first housing, a first pipe extending from the acoustic component toward a first end of the first housing, and a second pipe extending from an edge portion of the second housing to a second end of the second housing toward the first housing,
wherein when the first housing is accommodated in the second housing, the first end of the first housing or the second end of the second housing for connecting the first pipe and the second pipe are provided in a shape having a specified slope with respect to the edge portion of the second housing.

2. The electronic device of claim 1, wherein the first pipe comprises an opening in a diagonal shape corresponding to the first end, and
wherein the second pipe comprises an opening in a diagonal shape corresponding to the second end.

3. The electronic device of claim 2, wherein the first pipe is disposed inside the first housing, and
wherein the second pipe is formed to pass through the second housing.

4. The electronic device of claim 1, wherein based on the first housing sliding relative to the second housing, the first end of the first housing and the second end of the second housing remain parallel, and a separation distance therebetween decreases or increases.

5. The electronic device of claim 1, wherein based on the first housing being in a closed state with respect to the second housing, the first pipe and the second pipe are disposed to face, and are connected through, a closed connection space located between the first pipe and the second pipe.

6. The electronic device of claim 1, wherein based on the first housing being in an opened state with respect to the second housing, as the first pipe slides along with the first housing, the first pipe and the second pipe are disposed to be separate.

7. The electronic device of claim 1, further comprising a sealing member disposed at the first end of the first housing or at the second end of the second housing.

8. The electronic device of claim 7, wherein based on the first housing being in a closed state with respect to the second housing, the sealing member is provided in a closed loop shape and configured to seal a separation space between the first pipe and the second pipe.

9. The electronic device of claim 7, wherein an accommodating space formed by the sealing member corresponds to the sizes of diagonal shaped openings of the first pipe and the second pipe.

10. The electronic device of claim 7, wherein based on the first housing sliding relative to the second housing to switch to an opened state, one surface of the sealing member remains parallel to the first end of the first housing and forms an increasing separation distance.

11. The electronic device of claim 7, wherein based on the first housing sliding relative to the second housing to switch to a closed state, one surface of the sealing member remains parallel to the first end of the first housing and forms a decreasing separation distance.

12. The electronic device of claim 7, wherein the sealing member comprises an elastic material.

13. The electronic device of claim 1, wherein an area adjacent to the second end of the second housing has a guide portion configured to guide sliding movement of the first housing, and
wherein an area adjacent to the second end of the first housing has a slide portion configured to move along the guide portion.

14. The electronic device of claim 13, wherein the guide portion of the second housing is provided in a shape of a slide rail, and
wherein the slide portion of the first housing has a shape corresponding to the guide portion and has a structure in a protrusion or recess shape configured to move in engagement with the slide rail.

15. The electronic device of claim 1, further comprising:
a main printed circuit board disposed inside the first housing; and
a second acoustic assembly comprising a plurality of second connection terminals disposed on the main printed circuit board, disposed inside the second housing, and spaced apart from the acoustic assembly,
wherein the second acoustic assembly comprises:
a flexible printed circuit board;
a second acoustic component comprising acoustic circuitry mounted on the flexible printed circuit board;
at least one second pipe extending from an end of the second acoustic component to an edge portion of the second housing; and
and a first connection terminal disposed to face the first housing on the flexible printed circuit board,
wherein a first second connection terminal among the second connection terminals is electrically connected to the first connection terminal in an opened state of the first housing with respect to the second housing, and
wherein a second second connection terminal among the second connection terminals is spaced apart from the first second connection terminal and is electrically connected to the first connection terminal in a closed state of the first housing with respect to the second housing.

* * * * *